United States Patent
Ma et al.

(10) Patent No.: US 10,927,594 B2
(45) Date of Patent: Feb. 23, 2021

(54) VEHICLE DOOR FOR RAILWAY VEHICLE AND RAILWAY VEHICLE COMPRISING THE VEHICLE DOOR

(71) Applicant: IFE-VICTALL RAILWAY VEHICLE DOOR SYSTEMS (QINGDAO), Shandong (CN)

(72) Inventors: Duanjun Ma, Shandong (CN); Changyu Xie, Shandong (CN); Werner Hoefler, Shandong (CN)

(73) Assignee: IFE-VICTALL Railway Vehicle Door Systems (Qingdao) Co., Ltd., Shandong (CN)

( * ) Notice: Subject to any disclaimer, the term of this patent is extended or adjusted under 35 U.S.C. 154(b) by 326 days.

(21) Appl. No.: 16/063,083

(22) PCT Filed: Dec. 15, 2016

(86) PCT No.: PCT/CN2016/110155
§ 371 (c)(1),
(2) Date: Dec. 20, 2018

(87) PCT Pub. No.: WO2017/101820
PCT Pub. Date: Jun. 22, 2017

(65) Prior Publication Data
US 2020/0270938 A1   Aug. 27, 2020

(30) Foreign Application Priority Data
Dec. 15, 2015   (CN) .......................... 201510939222.4

(51) Int. Cl.
*E06B 7/22* (2006.01)
*B61D 19/00* (2006.01)
(Continued)

(52) U.S. Cl.
CPC ................. *E06B 7/22* (2013.01); *B60J 10/86* (2016.02); *B61D 19/00* (2013.01); *B61D 19/02* (2013.01)

(58) Field of Classification Search
CPC .... B61D 19/00; B61D 19/001; B61D 19/002; B61D 19/02; B60J 5/0469; B60J 10/86; E06B 7/22
See application file for complete search history.

(56) References Cited

U.S. PATENT DOCUMENTS 1,513,363 A    10/1924 Barrows
7,790,076 B2 *  9/2010 Seiter .................. B29C 44/1233
                                            264/41
(Continued)

FOREIGN PATENT DOCUMENTS

CN    101315017 A    12/2008
CN    201296155 Y     8/2009
(Continued)

OTHER PUBLICATIONS

International Search Report and Written Opinion for International Patent Application No. PCT/CN2016/110155; dated Mar. 9, 2017.
(Continued)

*Primary Examiner* — Andrew J Triggs
(74) *Attorney, Agent, or Firm* — Barnes & Thornburg LLP

(57) ABSTRACT

A vehicle door for a railway vehicle and a railway vehicle includes the vehicle door include a first door skin, a second door skin and a foaming material forming a laminated structure, the foaming material being filled between the first and second door skins, wherein the first door skin has at least one folded edge portion, and the second door skin has a first bent edge portion tightly clamped in the folded edge portion in a position corresponding to each of the folded edge portions. Since during the fixing of the first and second door
(Continued)

skins, at least part thereof is realized by a folding and clamping technique, adhesion failure risk between the door skins and a frame body is effectively lowered during use, the reliability of the fixed connection between the two door skins is improved, and the vehicle door weight and the production cost are reduced during manufacture.

18 Claims, 13 Drawing Sheets

(51) Int. Cl.
  *B60J 10/86* (2016.01)
  *B61D 19/02* (2006.01)

(56) References Cited

U.S. PATENT DOCUMENTS

2011/0011003 A1* 1/2011 Vogel .................. E06B 3/80
                                                    49/399
2016/0200182 A1    7/2016 Ogawa et al.

FOREIGN PATENT DOCUMENTS

| CN | 201908545 U | 7/2011 |
| CN | 203064047 U | 7/2013 |
| CN | 203305824 U | 11/2013 |
| CN | 104443961 A | 3/2015 |
| CN | 104747025 A | 7/2015 |
| CN | 105584494 A | 5/2016 |
| CN | 205239504 U | 5/2016 |
| DE | 9106271 U1 | 7/1991 |
| DE | 19723740 A1 | 12/1998 |
| DE | 102013108890 A1 | 2/2015 |
| EP | 2781277 A1 | 9/2014 |
| EP | 2805864 A1 | 11/2014 |
| GB | 526138 | 9/1940 |
| JP | H1126322 A | 9/1999 |
| JP | 2000220353 A | 8/2000 |
| JP | 2001146163 A | 5/2001 |
| JP | 2004066953 A | 3/2004 |
| JP | 2007303112 A | 11/2007 |
| JP | 2013184505 A | 9/2013 |
| WO | 2015033783 A1 | 3/2015 |

OTHER PUBLICATIONS

Indian Office Action corresponding to Indian Application 201837024840, dated Apr. 24, 2020.

\* cited by examiner

VEHICLE DOOR FOR RAILWAY VEHICLE AND RAILWAY VEHICLE COMPRISING THE VEHICLE DOOR

CROSS REFERENCE

The present application claims the priority of Chinese Patent Application No. 201510939222.4, filed with the State Intellectual Property Office on Dec. 15, 2015 and entitled "VEHICLE DOOR OF RAILWAY VEHICLE AND RAILWAY VEHICLE COMPRISING THE VEHICLE DOOR." The entire disclosure of the above application is incorporated herein by reference.

FIELD

The present disclosure relates to the field of railway vehicle equipment and particularly to a vehicle door of a railway vehicle and a railway vehicle including the vehicle door.

BACKGROUND

To adapt to the rapid development and significantly increasing operating speeds of railway traffic, vehicle supporting facilities need better cost control, to be safer to use and to have more stable structures.

An existing vehicle door on a railway vehicle generally includes a frame which consists of four beams and two layers of door skins. The frame can bond with each of the two layers of door skins via a circular strip of glue, respectively, and the two layers of door skins can be divided into an inner door skin and an outer door skin according to their positions after installation. When the railway vehicle shuttles between stations rapidly, the vehicle is subjected to continuous vibration impact. Furthermore, the vehicle is subjected to alternating cold and hot temperature press, high humidity, corrosion, and high thermal expansion due to an external environment. The aforementioned situations cause vibration stress at bonding positions between the door skins and the frame, thus decreasing firmness of or even breaking the bond between the door skins and the frame. Therefore, how to reduce probability of the above-mentioned problem of the vehicle door on the railway vehicle needs to be considered. Furthermore, requirements for reducing weight and production cost of the vehicle door also exist.

SUMMARY

Embodiments of the disclosure provide a vehicle door. First and second door skins of the vehicle door are connected mechanically, thereby lowering the risk of adhesion failure between the door skins and a frame of the vehicle door and improving reliability of the vehicle door. Furthermore, comparing with the existing vehicle door, the weight and production cost of the vehicle door according to the embodiments of the disclosure are significantly reduced.

DETAILED DESCRIPTION

Figure 1:
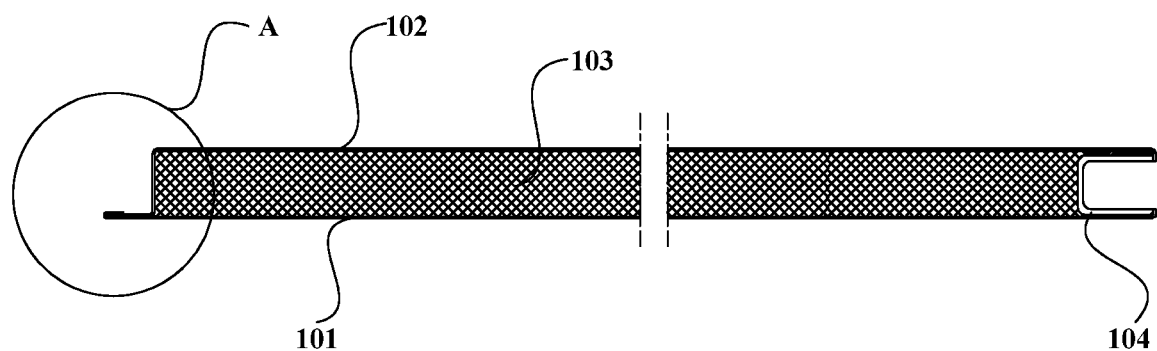
FIG. 1 is a structural schematic diagram of a lateral cross section of a vehicle door according to a first embodiment of the disclosure.

A vehicle door according to embodiments of the disclosure includes a first door skin, a second door skin and a foam material filled between the first and the second door skins. The first and the second door skins and the foam material form a laminated structure. The first door skin has at least one folded edge portion, and the second door skin has at least one first bent edge portion. Each of the at least one first bent edge portion is clamped in one of the at least one folded edge portion, correspondingly. That is, at least one part of the first and the second door skins is fastened by folding and clamping instead of by adhesion with beams of a frame, thereby lowering the risk of adhesion failure between the door skins and the frame, improving the reliability of the vehicle door and reducing the production cost.

In one aspect, an embodiment of the disclosure provides a vehicle door. The vehicle door includes a first door skin, a second door skin and a foam material filled between the first and the second door skins. The first and the second door skins and the foam material form a laminated structure. The first door skin has at least one folded edge portion. The second door skin has at least one first bent edge portion. Each of the at least one first bent edge portion is clamped in one of the at least one folded edge portion, correspondingly.

In the vehicle door according to the embodiment of the disclosure, the first and the second door skins are fastened at least partly through folding and clamping instead of adhesion with the frame. Comparing with the existing technology where the first and the second door skins are only fastened through the adhesion with the frame, in the embodiment of the disclosure, no frame needs to be arranged in a position corresponding to the folded and clamped portions of the first and the second door skins, thereby reducing the weight of the vehicle door and saving the production cost, e.g., materials for the frame and the adhesive and the time for assembling the frame are saved. Moreover, since the first and the second door skins are fastened at least partly by folding and clamping, the risk of the adhesion failure between the door skins and the frame can be lowered and the connection of the door skins can be strengthened, thereby increasing the reliability and safety of the railway vehicle using the vehicle door.

In order to make better use of the above-mentioned advantages of the disclosure, in a second aspect, edges of the first door skin are all folded. In this second aspect, since the frame is omitted, stability and strength of the structure of the vehicle door can be further improved when the vehicle door is in kink shape.

Since usually the vehicle door has a window, in order to strengthen the connection of the first and the second door skins at the window, in a third aspect of the disclosure, each of the first and the second door skins has an opening and the openings are opposite each other. The second door skin has at least one second bent edge portion at the opening of the second door skin. Each of the at least one second bent edge portion is able to be superposed and fastened onto an edge portion of the first door skin at the opening of the first door skin to form a step groove for accommodating a window plate at the openings.

In all the aspects described above, in order to further improve the sealing performance and the connection reliability of the vehicle door, adhesive is arranged in the contact area of the first and the second door skins. Or, an edge portion of the first door skin and an edge portion of the second door skin are connected via weld-bonding. Or, a sealant is arranged in the contact area of the first and the second door skins, and an edge portion of the first door skin and an edge portion of the second door skin are fastened through riveting.

Furthermore, to better insulate against noise so that passengers feel comfortable when the railway vehicle is running on the track, in another aspect of the disclosure, the first and the second door skins can have different thicknesses. The first door skin can be an inner door skin and the second door skin can be an outer door skin. The outer door skin can be thicker than the inner door skin to increase the reliability of the vehicle door. In another aspect of the disclosure, the first and the second door skins can be made of stainless steel.

Considering that side surfaces of the vehicle body of the railway vehicle are usually in kink shape in order to meet the requirement of the operation of railway vehicles, according to another implementation of the disclosure, the vehicle door can be in kink shape. Since a door skin portion forming a longitudinal side face of the vehicle door is prone to produce residual stress at a kink position and lower the strength of the vehicle door, in another aspect of the disclosure, the door skin portion forming the longitudinal side face of the vehicle door can have a cut at the kink position.

In another aspect of the disclosure, the vehicle door further includes a connector arranged at one side face of the vehicle door.

In another aspect of the disclosure, the vehicle door further includes a stiffening plate arranged at one side face of the vehicle door.

In another aspect of the disclosure, the vehicle door further includes a strip-shaped seal for sealing a gap between the vehicle door and a vehicle body or between vehicle doors. The strip-shaped seal includes a main body to be fastened to a side face of the vehicle door via a connector, and a first sealing lip and a second sealing lip both extending from one side of the main body. Two opposite sides of the first and the second sealing lips can engage together to be fastened. The first and the second sealing lips after the engagement and the main body are able to form a space for accommodating the connector. With such a vehicle door, the strip-shaped seal of the vehicle door can be assembled or disassembled conveniently when the vehicle door and the vehicle body are assembled, therefore the maintenance of the vehicle door can be convenient, the time for assembling and disassembling can be saved and the work efficiency can be increased.

Moreover, the first sealing lip can engage with the second sealing lip in different ways. In another aspect of the disclosure, the first and the second sealing lips can engage together and be fastened via a projection and an indentation arranged on the opposite sides of the first and the second sealing lip, respectively.

The quantity of the projections and indentations is not restricted. For example, in another aspect of the disclosure, a plurality of spaced projections are arranged on the first sealing lip along a longitudinal direction of the first sealing lip. Or, one projection extending along the longitudinal direction of the first sealing lip is arranged on the first sealing lip. Such a projection and the main body can form the space for accommodating the connector at one side of a portion of the engagement after the first sealing lip and the second sealing lip engage together, so that the connector is covered and the vehicle door look prettier externally, and the connector could be prevented from corrosion of the external environment.

Considering that the engagement and separation of the strip-shaped seal and a sealing strip of the vehicle body need to be easy, in another aspect of the disclosure, the first and the second sealing lips of the strip-shaped seal can form a dovetail groove engaging with the sealing strip on the vehicle body at one side of the portion of the engagement far away from the main body, so that the strip-shaped seal and the sealing strip of the vehicle body can be separated or engage together easily during motion of the vehicle door. Of course, the first and the second sealing lips of the strip-shaped seal can also form another type of groove engaging with the sealing strip on the vehicle body at the side of the portion of the engagement far away from the main body, or ends of the first and the second sealing lips of the strip-shaped seal far away from the main body could form a sealing portion engaging with a sealing groove on the vehicle body.

Moreover, a projection and an indentation can have different forms. For example, a projection can be spherical or have a barb shape. Considering that the vibration impact to the vehicle door when the railway vehicle is running might cause the failure of the engagement between the first and the second sealing lips, to strengthen the connection, in another aspect of the disclosure, the projection is barb-shaped, that is, the cross section of the projection has a barb shape.

In another aspect of the disclosure, the vehicle door can include another form of strip-shaped seal, which is also easy to be assembled and disassembled, and is used to seal a gap between the vehicle door and the vehicle body or between the vehicle doors. The strip-shaped seal has a main body to be fastened to a side face of the vehicle door by a connector, and a first sealing lip and a second sealing lip both extending from one side of the main body. The first sealing lip has a protrusion on a side of the first sealing lip, and the second sealing lip has a protrusion on a side of the second sealing lip, where the side of the first sealing lip is opposite the side of the second sealing lip. The first and the second sealing lips and the main body form a space for accommodating the connector at one side of the protrusions.

Furthermore, when the connector used to connect the strip-shaped seal is a screw, the vehicle door in another aspect of the disclosure can further include a press plate located between a head of the screw and the main body.

In another aspect of the disclosure, the strip-shaped seal is made of rubber. Of course, the strip-shaped seal can also be made of another elastic material so long as the gap between the vehicle door and the vehicle body can be sealed by the strip-shaped seal.

Another aspect of the disclosure provides a railway vehicle which includes a vehicle door according to any one of the above-mentioned embodiments. When a railway vehicle is fitted with any one of the above-mentioned vehicle doors, the weight of the vehicle door can be reduced and the production cost can be saved. Herein the "longitudinal direction" of the vehicle door refers to the up-down direction of the vehicle door after the vehicle door is installed on the railway vehicle, and accordingly, the "lateral direction" of the vehicle door refers to the front-back direction of the vehicle door after the vehicle door is installed on the railway vehicle. The "inner door skin" refers to a door skin of the vehicle door facing the interior of the carriage of the railway vehicle after the vehicle door is installed on the railway vehicle, and accordingly, the "outer door skin" refers to a door skin of the vehicle door facing the external environment of the carriage of the railway vehicle after the vehicle door is installed on the railway vehicle.

In order to explain the disclosure more clearly, rectangular vehicle doors are taken as examples in different embodiments below, which are described in details with reference to the drawings.

Explanations of reference signs: first door skin 101; second door skin 102, 302; folded edge portion 1011; first bent edge portion 1021; window plate 106; adhesive 105, 107; foam material 103; cut 3023; first connector 30; strip-shaped seal 40, 41; stiffening plate 50; door body 10; second connector 60; main body 401, 411; first sealing lip 402a, 412a; second sealing lip 402b, 412b; projection 402a1; indentation 402b1; protrusion 412a1, 412b1; installation hole 4011; vehicle body 500; sealing strip 501; press plate 600; slider 700.

Figure 2:
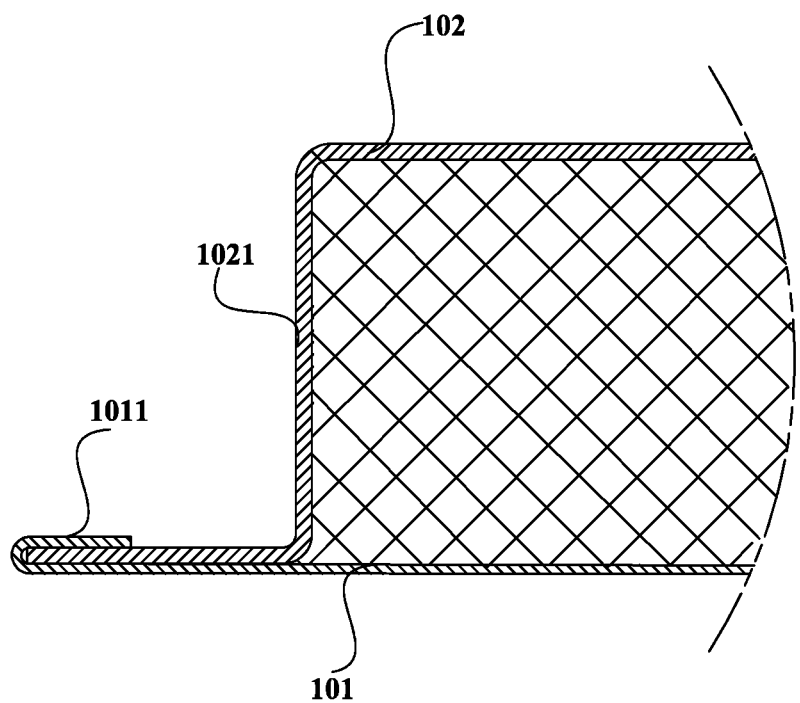
FIG. 2 is an amplified structural schematic diagram of a part A in FIG. 1.

As illustrated by FIGS. 1 and 2, which are structural schematic diagrams of a vehicle door according to a first embodiment of the disclosure, the vehicle door includes a first door skin 101, a second door skin 102, a frame 104 consisting of three beams, and a foam material 103 filled between the first door skin 101 and the second door skin 102. The first door skin 101, the second door skin 102 and the foam material 103 form a laminated structure. The first door skin 101 has a folded edge portion 1011, and the second door skin 102 has a first bent edge portion 1021 corresponding to and clamped in the folded edge portion 1011. That is, a part of the edge of the first door skin 101 clamps and fastens a part of the bent edge of the second door skin 102 through folding and clamping. Except the folded and clamped parts, other parts of the first door skin 101 and other parts of the second door skin 102 and the frame 104 bond together via adhesive.

As can be seen from the above-mentioned structure, during fabrication of the vehicle door according to the first embodiment, the first door skin 101 and the second door skin 102 are fastened partly through folding and clamping instead of adhesion with the beams of the frame. Comparing with the existing technology where all parts of the first and the second door skins are fastened through the adhesion with the frame, in the first embodiment of the disclosure, no frame needs to be arranged in a position corresponding to the folded and clamped portions of the first door skin 101 and the second door skin 102, thereby reducing the weight of the vehicle door and saving the production cost, e.g., materials for the frame and for the adhesive and time for assembling the frame are saved.

Figure 7:
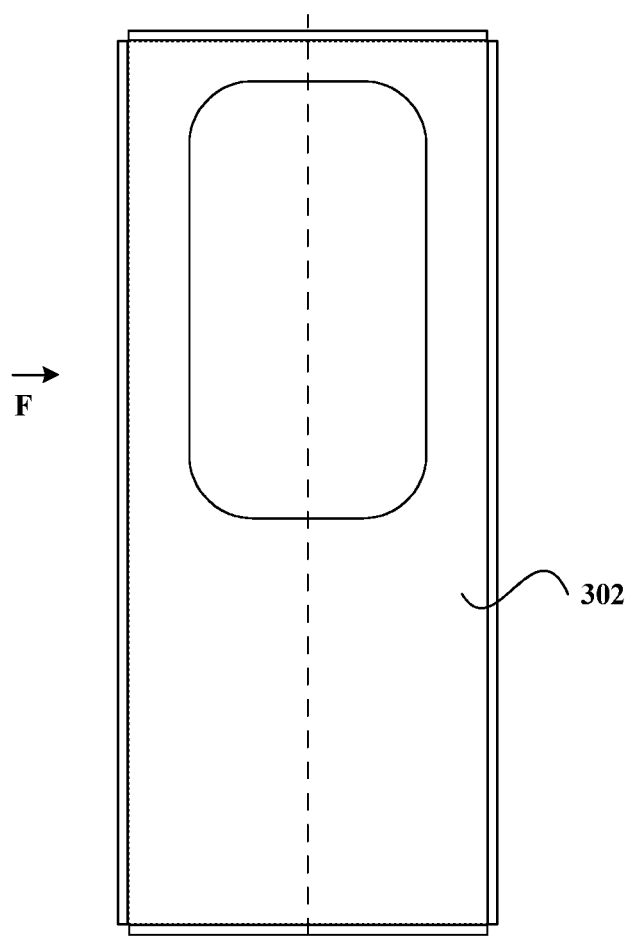
FIG. 7 is a structural schematic diagram of a main view of a vehicle door according to a fourth embodiment of the disclosure.
Figure 8:
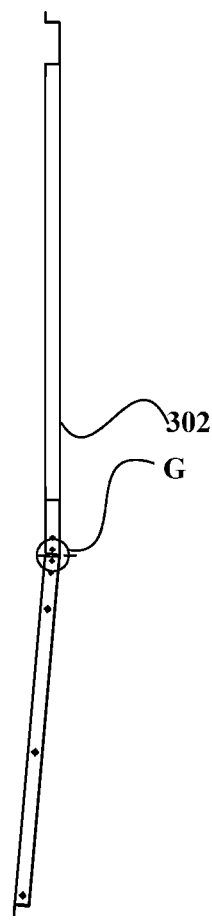
FIG. 8 is a view of the vehicle door illustrated by FIG. 7 along a direction of F.

Furthermore, as can be seen in FIG. 1 as well as in FIGS. 7 and 8, the first folded edge portion 1011 and the first bent edge portion 1021 are on a longitudinal side face of the vehicle door. In order to fit the side-face profile of the railway vehicle, a longitudinal beam of the frame of the conventional vehicle door must be bent to form a kink position (as illustrated in FIG. 8), which could easily cause residual bending stress and rebounding of the filled foam material. On the contrary, the vehicle door according to the first embodiment of the disclosure can avoid such a problem because the longitudinal beam is omitted, thereby increasing the stability and strength of the structure of the vehicle door.

In the first embodiment, the folded edge portion 1011 is located on a longitudinal edge of the first door skin 101. Yet of course, the folded edge portion can also be located on a lateral edge at the top or bottom side of the first door skin. Furthermore, although the first embodiment only shows that only one pair of edge portions of the first and the second door skins are connected via folding and clamping, two, three or even all pairs of edge portions of the first and the second door skins can also be connected via folding and clamping instead of adhesion with the frame.

Figure 3:
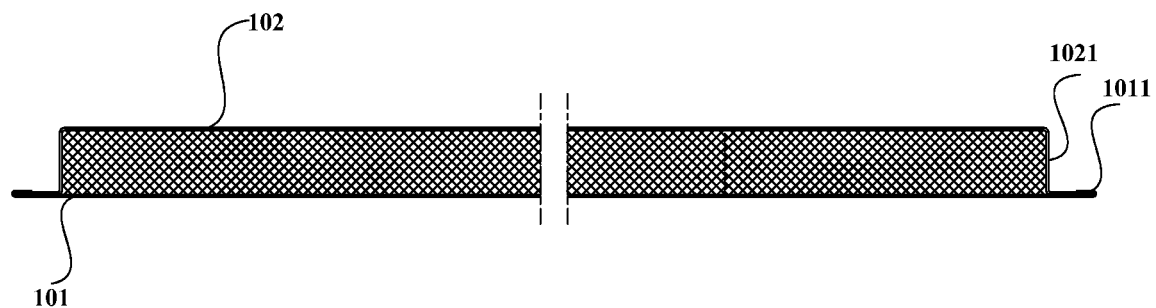
FIG. 3 is a structural schematic diagram of a lateral cross section of a vehicle door according to a second embodiment of the disclosure.

As illustrated by FIG. 3, which is a structural schematic diagram of a vehicle door according to a second embodiment of the disclosure, the difference between the second embodiment and the first embodiment is that all the edges of the first door skin 101 are folded edge portions 1011, and all the edges of the second door skin 102 are first bent edge portions 1021. That is, the first door skin 101 and the second door skin 102 of the vehicle door according to the second embodiment are fastened solely through folding and clamping of the edge portions and the vehicle does not need a frame.

As such, during fabrication of the vehicle door according to the second embodiment, the weight of the vehicle door can be significantly reduced and the production cost can be saved. For example, fewer materials (e.g., up to 50%) for the frame and for the adhesive are needed and the time for assembling the frame is saved. Particularly, when using the vehicle door according to the second embodiment, since the two door skins are fastened solely through folding and clamping, the connection of the first and the second door skins is strengthened, thereby increasing the reliability and safety of the railway vehicle fitted with the vehicle door. In addition, since the frame is omitted, the stability and strength of the structure of the vehicle door can be increased when the vehicle door is bent.

It is noteworthy that the first door skin can be an inner door skin and the second door skin can be an outer door skin, or vice versa, which is determined according to the operating requirements of the vehicle door. In order to facilitate installation of the vehicle door and improve sealing of the gap between the vehicle door and the vehicle body, in some embodiments of the disclosure, the first door skin is the inner door skin and the second door skin is the outer door skin. That is, at least one part of edges of the inner door skin is folded and clamps at least one part of edges of the outer door skin, and in one implementation, all edge portions of the inner door skin are folded and clamp the edges of the outer door skin.

Figure 6:
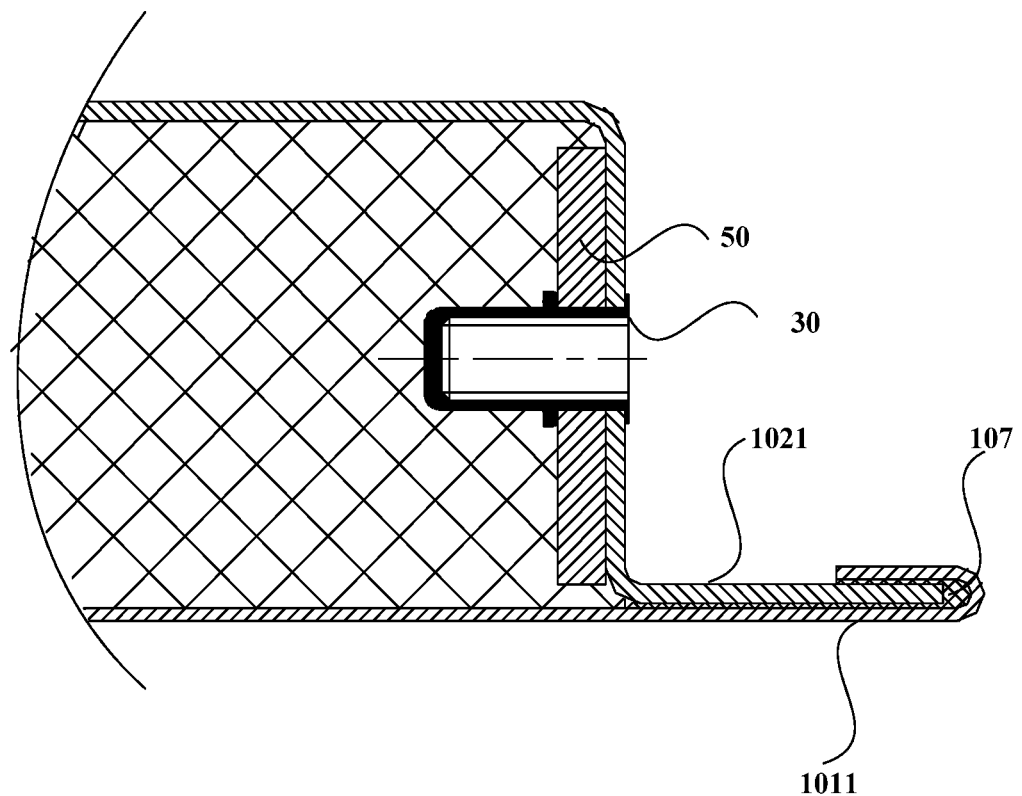
FIG. 6 is an amplified structural schematic diagram of a part D without a strip-shaped seal in FIG. 4.

Furthermore, to improve the sealing performance and the connection reliability of the vehicle door, the vehicle door according to one implementation can further be coated with adhesive 107 in a contact area of the first door skin 101 and the second door skin 102 (as illustrated by FIG. 6). Of course, those skilled in the art shall understand that an edge portion of the first door skin 101 and an edge portion of the second door skin 102 can also be fastened and connected through weld-bonding, or a contact area of the first door skin 101 and the second door skin 102 can be coated with a sealant, and an edge portion of the first door skin 101 and an edge portion of the second door skin 102 can be fastened through riveting.

Figure 4:
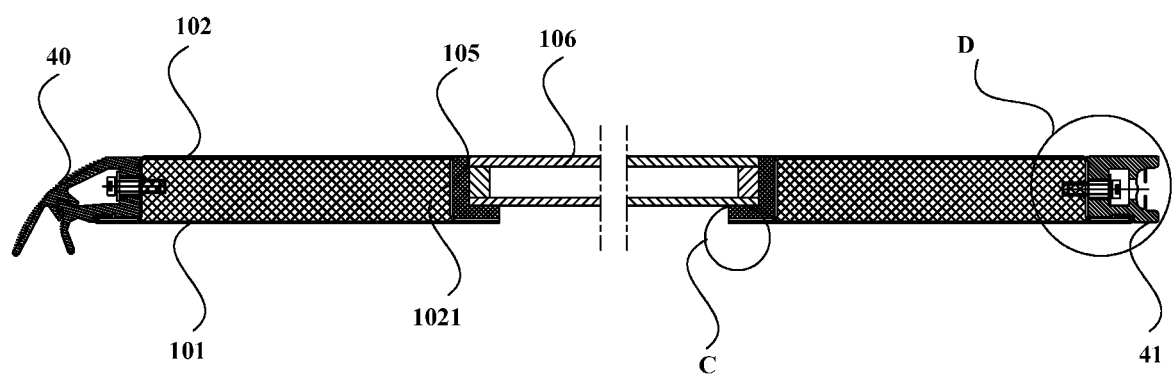
FIG. 4 is a structural schematic diagram of a lateral cross section of a vehicle door according to a third embodiment of the disclosure.
Figure 5:
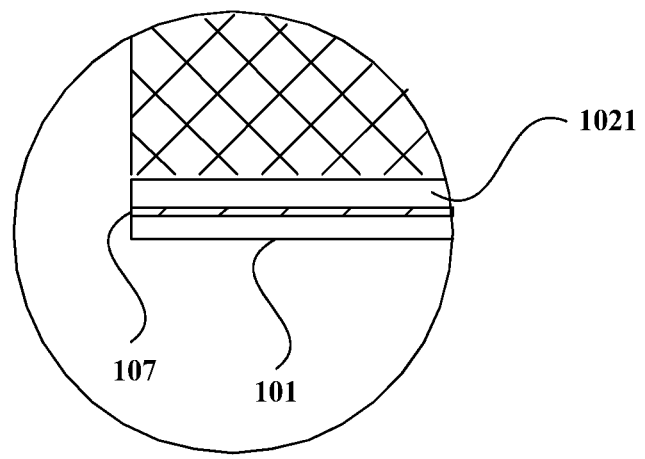
FIG. 5 is an amplified structural schematic diagram of a part C in FIG. 4.

Furthermore, since usually a vehicle door has a window, based on any one of the embodiments described above, the first and the second door skins each can have an opening facing each other. As such, a third embodiment of the disclosure further provides a vehicle door as illustrated by FIGS. 4 to 6, where the first door skin 101 and the second door skin 102 each have an opening opposite each other, all the edge portions at the opening of the second door skin 102 are second bent edge portions 1021 which can be superposed on edge portions of the first door skin 101 at the opening of the first door skin 101 to form a step groove accommodating a window plate 106 at the openings of the first and the second door skins. The first door skin 101 and the second door skin 102 are connected via the adhesive 107 in the contact areas (superposed portions) of the first door skin 101 and the second door skin 102. The window plate 106 can be bonded and fastened in the step groove through the adhesive 105.

As can be seen from the above-mentioned structure, the edge portions of the first door skin 101 and the second door skin 102 of the vehicle door according to the third embodiment are connected at the openings for arranging the window plate without a window frame, thus increasing the reliability and safety of the vehicle door.

Of course, in the third embodiment, at the superposed portions of the first and the second door skins, edge portions of the first door skin 101 and edge portions of the second door skin 102 can also be connected and fastened via weld-bonding. Or, a sealant can be arranged at the contact areas of the first door skin 101 and the second door skin 102, and the edge portions at the openings of the first door skin 101 and the second door skin 102 are fastened by a rivet, so that the first door skin 101 is not connected with the second door skin 102 via the adhesive at the superposed portions.

Figure 9:
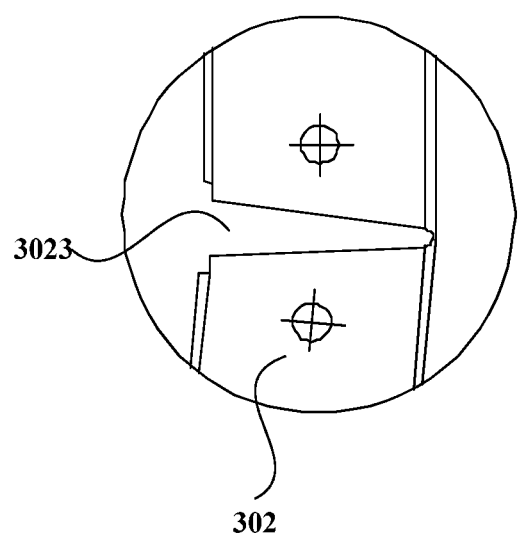
FIG. 9 is an amplified structural schematic diagram of a part G in FIG. 8.

In order to fit the bent side face of the vehicle body of the railway vehicle, usually the vehicle door of the railway vehicle can have a kink portion. The kink portion of the vehicle door is prone to produce residual stress, which reduces strength of the vehicle door. Therefore, a fourth embodiment of the disclosure further provides another vehicle door. Based on any one of the embodiments described above, and as illustrated by FIGS. 7 to 9, a portion of the second door skin 302 forming the longitudinal side face of the vehicle door has a cut 3023 at the kink position. The cut can extend from one edge to the other edge of the longitudinal side face. For example, as illustrated by FIG. 9, the cut can be a V-shaped cut having a preset angle which can be determined according to the requirements of the vehicle door. For example, when the bent angle of the vehicle door is 5°, the preset angle can be equal to or greater than 5°.

When the second door skin 302 is bent, residual extrusion stress caused by the bending can be reduced or even eliminated because of the cut in the portion of the door skin forming the longitudinal side face of the vehicle door, so that the strength of the vehicle door is increased.

As such, to reduce the residual extrusion stress caused by the bending, each portion of the door skin forming a longitudinal side face of the vehicle door can have a cut at a bending position.

Figure 10:
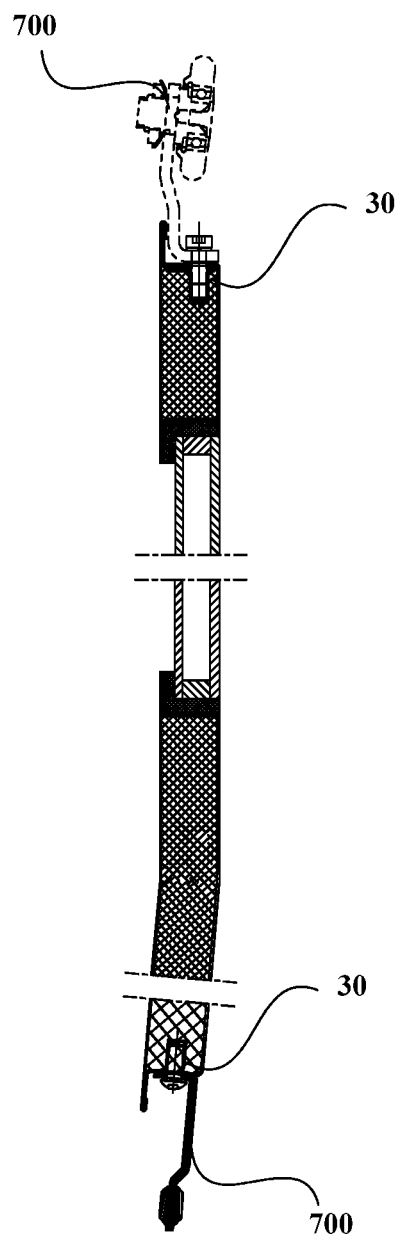
FIG. 10 is a structural schematic diagram of a longitudinal cross section of a vehicle door according to a fifth embodiment of the disclosure.

In addition, consider fitting the vehicle body with the vehicle door, a fifth embodiment of disclosure provides another vehicle door. Based on any one of the embodiments described above and as illustrated by FIGS. 6 and 10, the vehicle door according to the fifth embodiment further includes a first connector 30 arranged at a side face of the vehicle door, for connecting the vehicle door to an installation portion (e.g., slider 700 as shown in FIG. 10 and etc.) connected with the vehicle body for example via screws, and for installing a strip-shaped seal (e.g., strip-shaped seals 40, 41 as illustrated by FIG. 4) at the side face of the vehicle door for example via screws. For example, as shown by FIG. 6, the first connector 30 arranged at the side face of the vehicle door is a rivet nut.

Also, as illustrated by FIG. 6, in order to increase the connection strength of the vehicle door, another embodiment of the disclosure further provides another vehicle door, which can further include a stiffening plate 50 arranged at a side face of the vehicle door based on any one of the embodiments described above, to increase the connection strength of the vehicle door.

Furthermore, to better insulate against noise so that passengers feel comfortable when the railway vehicle is running on the track, in any embodiment of the disclosure, the first and the second door skins can have different thicknesses, so that no resonance occurs between the first and the second door skins when the railway vehicle is running on the track, thereby improving the acoustic insulation and noise reduction performance of the vehicle door and increasing the passengers' comfort.

Also, since the outer door skin of the vehicle door suffers from a greater impulsive load and directly contacts the external environment of high humidity, corrosion and high thermal expansion, in any embodiment of the disclosure, the outer door skin can be thicker than the inner door skin, to increase the reliability of the vehicle door. In an implementation, the outer door skin is 20% to 150% thicker than the inner door skin. Furthermore, the material of the door skins of the vehicle door according to embodiments of the disclosure is not restricted, and for example can be stainless steel, aluminium alloy and etc.

In addition, the vehicle door could be fitted with a strip-shaped seal, so as to seal the railway vehicle after the assembling of the vehicle door and the vehicle body. FIGS.

Figure 12:
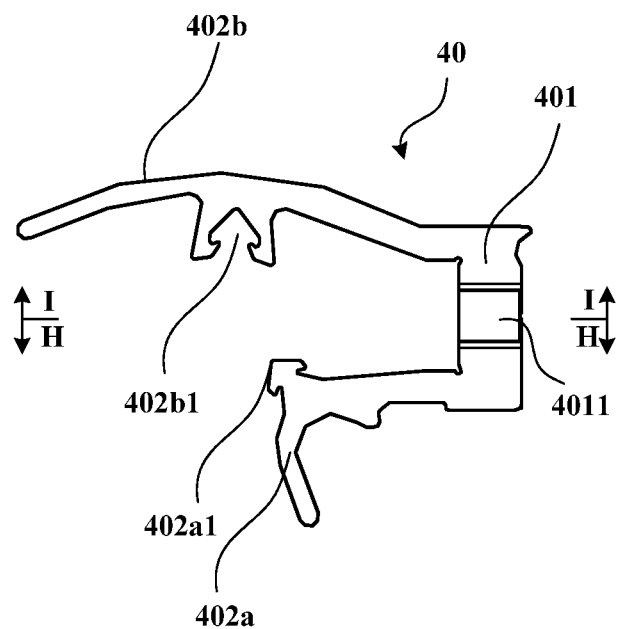
FIG. 12 is a structural schematic diagram of a lateral cross section of the strip-shaped seal shown in FIG. 11.
Figure 13:
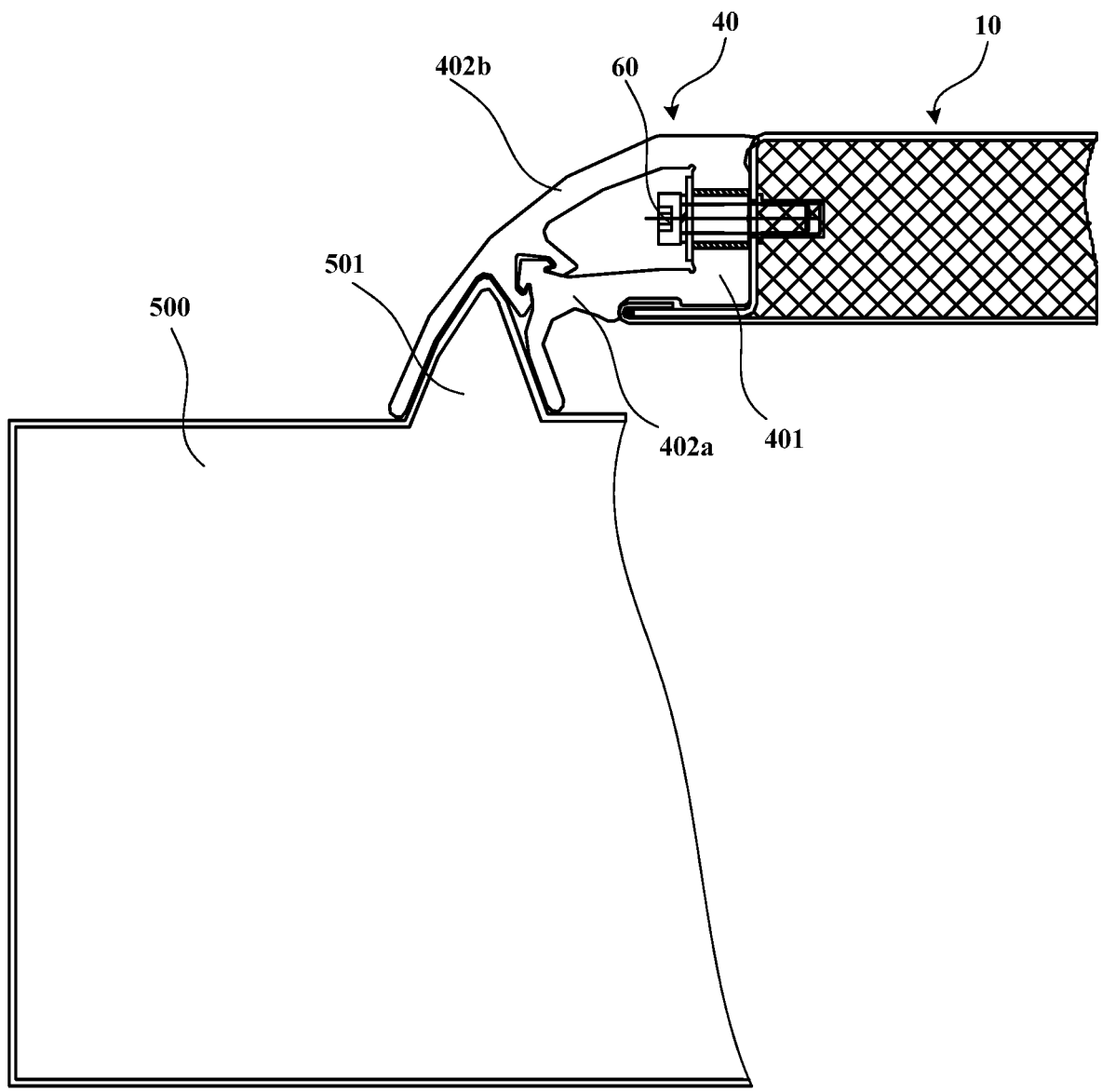
FIG. 13 is a partial schematic diagram of a lateral cross-section structure of the vehicle door shown in FIG. 11 with the first sealing lip engaging with the second sealing lip of the strip-shaped seal.

4, 11 and 19 show a structural schematic diagram of a lateral cross section and partial schematic diagrams of different parts of another vehicle door according to another embodiment of the disclosure, respectively. FIG. 12 illustrate the structure of the strip-shaped seal 40, and FIG. 13 shows an amplified partial schematic diagram of the lateral cross-section structure of the vehicle door after the installation of the strip-shaped seal. The vehicle door includes a door body 10, the strip-shaped seal 40 and a second connector 60. The laminated structure consisting of the first and the second door skins and the foam material forms the door body 10.

The strip-shaped seal 40 has a main body 401, and a first sealing lip 402a and a second sealing lip 402b both extending from one side of the main body 401. The first sealing lip 402a has a projection 402a1, the second sealing lip 402b has an indentation 402b1, and the projection 402a1 could engage with the indentation 402b1 so that both of them are fastened. The main body 401 has an installation hole 4011.

Figure 11:
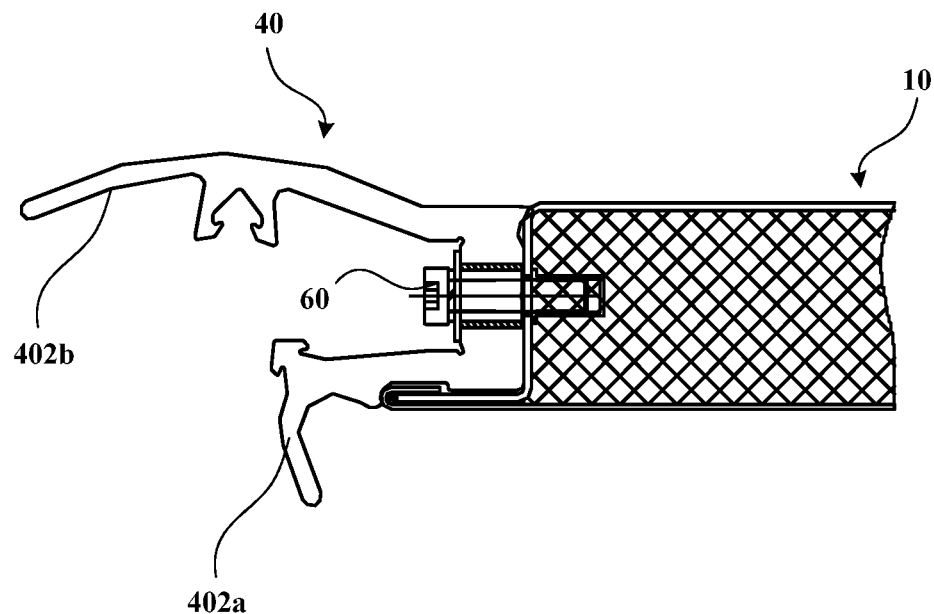
FIG. 11 is a partial schematic diagram of a lateral cross-section structure of a vehicle door fitted with a strip-shaped seal (where a first sealing lip does not engage with a second sealing lip) according to an embodiment of the disclosure.

The installation process of the vehicle door according to the embodiment is as follows: initially the projection 402a1 and the indentation 402b1 of the first and the second sealing lips of the strip-shaped seal 40 are separated (see FIG. 12); the strip-shaped seal 40 is fastened to the door body 10 by the second connector 60 passing through the installation hole 4011 (see FIG. 11); then the projection 402a1 engages with the indentation 402b1 and both of them are fastened so that the first sealing lip 402a and the second sealing lip 402b engage together; the first sealing lip 402a, the second sealing lip 402b and the main body 401 form a space for accommodating the second connector 60, and the first sealing lip 402a and the second sealing lip 402b form a dovetail groove at one side of the portion of the engagement far away from the main body 401; then the vehicle door fitted with the strip-shaped seal 40 is assembled onto the vehicle body 500, so that the dovetail groove of the strip-shaped seal 40 engages with a sealing strip 501 on the vehicle body 500.

As can be known from the above-mentioned installation process of the embodiment, when the strip-shaped seal of the vehicle door according to the embodiment needs to be replaced, firstly the projection 402a1 and the indentation 402b1 can be separated, and then the second connector 60 is detached so that the strip-shaped seal is detached from the door body 10; then a new strip-shaped seal can be installed and fastened onto the door body 10 by the connector, implementing the replacement of the strip-shaped seal conveniently.

As can be seen from the descriptions above, comparing with the existing technology, in the embodiment of the disclosure, the strip-shaped seal of the vehicle door can be assembled or disassembled conveniently when the vehicle door and the vehicle body are assembled, therefore the maintenance of the vehicle door becomes very convenient, the time for assembling and disassembling can be saved and the work efficiency can be increased.

Figure 14:
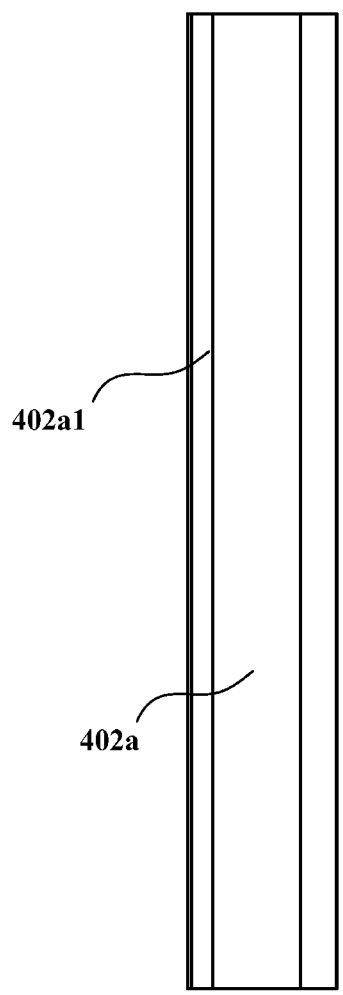
FIG. 14 is a structural schematic diagram of a section view of the strip-shaped seal shown in FIG. 12 along a direction of H-H.
Figure 15:
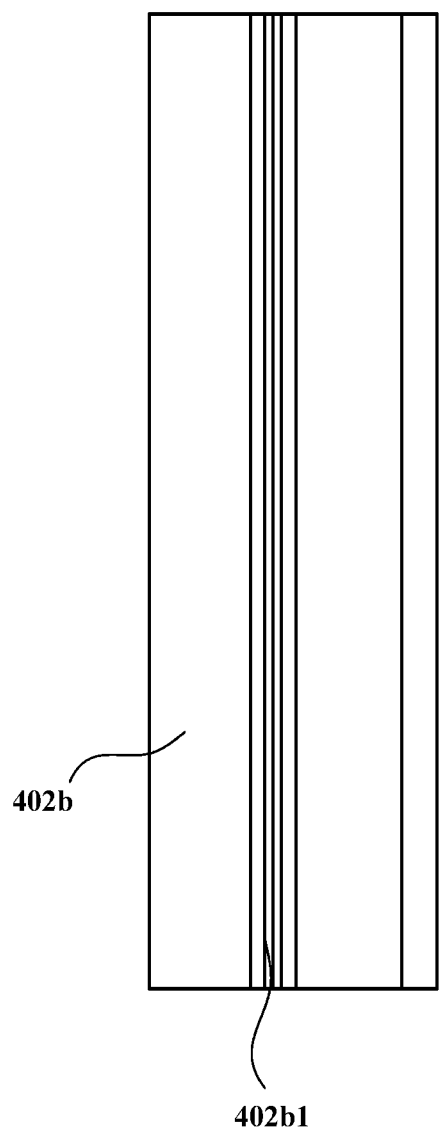
FIG. 15 is a structural schematic diagram of a section view of the strip-shaped seal shown in FIG. 12 along a direction of I-I.

In addition, after the first and the second sealing lips of the strip-shaped seal according to the embodiment engage together and are fastened, since the first sealing lip 402a has a projection extending along the longitudinal direction of the first sealing lip 402a (see FIG. 14) and the second sealing lip 402b has an indentation extending along the longitudinal direction of the second sealing lip 402b (see FIG. 15), the first and the second sealing lips and the main body form the space sealing the connector, which covers the connector in the installation hole well and prevent the connector from corrosion of the external environment.

Moreover, as can be known from the installation process of the strip-shaped seal described above, in embodiment of the disclosure, the strip-shaped seal can be installed onto the door body simply via the connector without arranging a T-shape groove on the door body.

Figure 16:
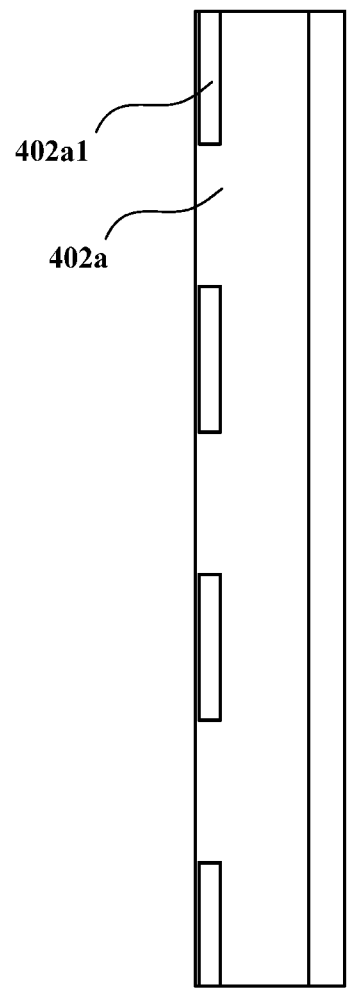
FIG. 16 is a structural schematic diagram of a section view the strip-shaped seal shown in FIG. 12 along a direction of H-H according to another implementation.
Figure 17:
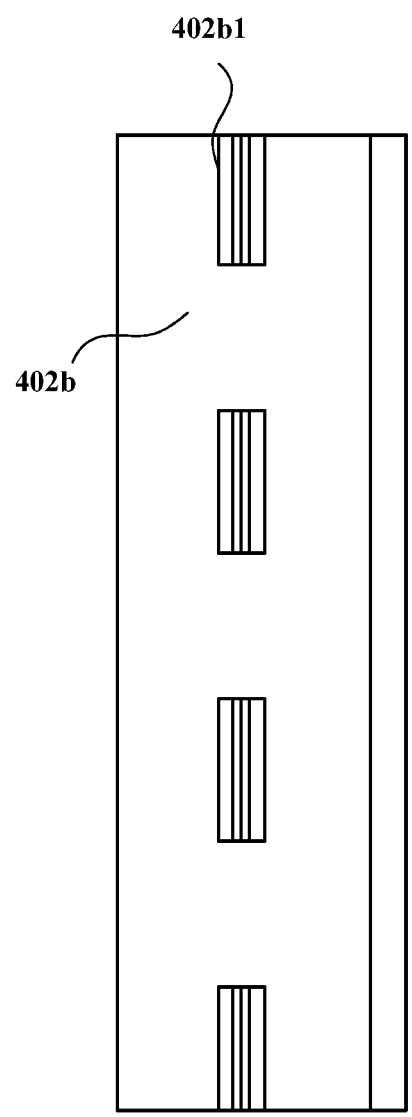
FIG. 17 is a structural schematic diagram of a section view of the strip-shaped seal shown in FIG. 12 along a direction of I-I according to another implementation.

In addition, the embodiment shows that the first sealing lip 402a has a projection extending along the longitudinal direction thereof, but it should be appreciated that the first sealing lip 402a can also have a plurality of spaced projections arranged in the longitudinal direction of the first sealing lip 402a. For example, as illustrated by FIG. 16, the first sealing lip 402a has a plurality of (e.g., two, three, or more) spaced projections in the longitudinal direction thereof. Four projections are illustrated in FIG. 16 according to the embodiment, and accordingly, four indentations are arranged on the second sealing lip 402b (see FIG. 17).

It is noteworthy that the projections and the indentations can have different forms. For example, a projection can be spherical or have a barb shape and etc. In one implementation, the projection is barb-shaped (see FIG. 12) to increase the reliability of the engagement between the first and the second sealing lips.

Figure 19:
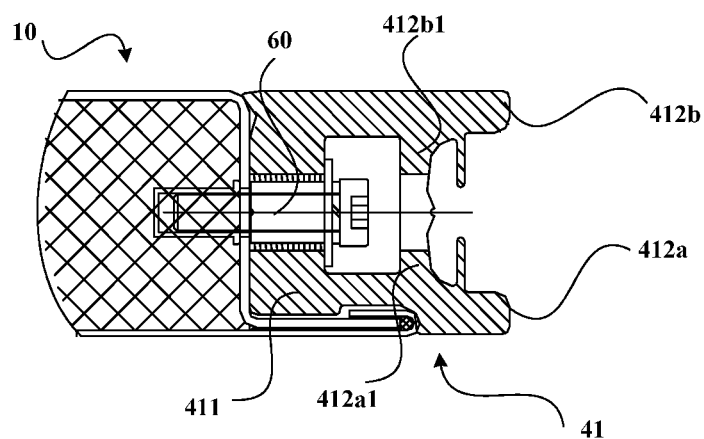
FIG. 19 is a partial schematic diagram of a lateral cross-section structure of a vehicle door fitted with a strip-shaped seal according to another implementation of the disclosure.

FIG. 19 shows another implementation of the strip-shaped seal. The strip-shaped seal 41 has a main body 411, and a first sealing lip 412a and a second sealing lip 412b both extending from one side of the main body 411. The first sealing lip 412a has a protrusion 412a1 on a side of the first sealing lip 412a, and the second sealing lip 412b has a protrusion 412b1 on a side of the second sealing lip 412b, where the side of the first sealing lip 412a is opposite the side of the second sealing lip 412b. The first sealing lip 412a, the second sealing lip 412b and the main body 411 form a space for accommodating the second connector 60 at one side of the protrusions (412a1, 412b1), and the first sealing lip 412a and the second sealing lip 412b connect a strip-shaped seal on another vehicle door or on the vehicle body at the other side of the protrusions (412a1, 412b1) far away from the main body.

It is noteworthy that the material of the strip-shaped seal is not restricted and can be any elastic material able to be used for sealing, e.g., rubber. In the embodiment of the disclosure, the strip-shaped seal and the door body are connected via screws and the installation hole, but it shall be understood that the connector is not limited thereto, and for example, can also be a rivet, a cotter nail and etc.

Figure 18:
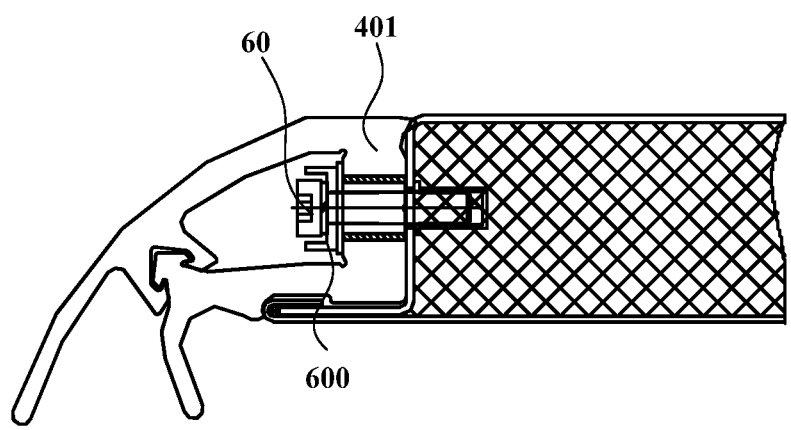
FIG. 18 is a partial schematic diagram of a lateral cross-section structure of a vehicle door fitted with a strip-shaped seal according to another embodiment of the disclosure.

Moreover, when a screw is used as the connector, in order to strengthen the connection between the screw and the strip-shaped seal, as illustrated by FIG. 18, based on the previous implementation, the vehicle door of the disclosure further includes a press plate 600 located between the head of the screw (second connector 60) and the main body 401.

Since the vehicle door according to the implementation further includes the press plate arranged between the head of the screw and the main body, the connection of the screw and the strip-shaped seal can be strengthened in addition to the convenient assembling and disassembling of the strip-shaped seal. When the strip-shaped seal is made of rubber, the above-mentioned advantageous effect is particularly obvious, and connection abrasion between the screw and the rubber can be prevented, thereby strengthening the connection.

The bent edge portion herein can be obtained by a bending machine bending a sheet metal component, and the folding and clamping can be realized by mechanical equipment able to fold and clamp the edge portions of the first and the second door skins. The engagement of the first and the second sealing lips of the strip-shaped seal can also be realized by fitting a hook into a bayonet. The foam material can be polyurethane foam and etc., which is not limited herein.

Although the vehicle doors according to the embodiments of the disclosure are illustrated as rectangular, it shall be understood by those skilled in the art according to the embodiments described herein that all the beneficial technical features described above can also be applied to a vehicle door having another shape as required.

The specific implementations of the disclosure have been described in details with reference to the drawings. Evidently those skilled in the art can make various modifications and variations to the disclosure without departing from the spirit and scope of the disclosure. Thus the disclosure is also intended to encompass these modifications and variations as long as these modifications and variations come into the scope of the claims of the disclosure and their equivalents.

The invention claimed is:

1. A vehicle door of a railway vehicle, the vehicle door comprising:
   a first door skin;
   a second door skin; and
   a foam material filled between the first and the second door skins,
   wherein the first and the second door skins and the foam material form a laminated structure, the first door skin has at least one folded edge portion, the second door skin has at least one first bent edge portion, and each of the at least one first bent edge portion is clamped in one of a corresponding at least one folded edge portion,
   a strip-shaped seal for sealing a gap between the vehicle door and a vehicle body or between vehicle doors,
   wherein the strip-shaped seal has a main body to be fastened to a side face of the vehicle door via a connector, and a first sealing lip and a second sealing lip both extending from one side of the main body;
   a side of the first sealing lip is opposite a side of the second sealing lip, wherein the two opposite sides of the first and the second sealing lips can engage together to be fastened; and
   the first and the second sealing lips after the engagement and the main body are able to form a space for accommodating the connector.

2. The vehicle door of claim 1, wherein edges of the first door skin are all folded edge portions.

3. The vehicle door of claim 2, wherein:
   each of the first and the second door skins has an opening and the openings of the first and the second door skins are opposite each other;
   the second door skin has at least one second bent edge portion at the opening of the second door skin; and
   the at least one second bent edge portion is superposed and fastened onto an edge portion of the first door skin at the opening of the first door skin to form a step groove for accommodating a window plate at the openings of the first and the second door skins.

4. The vehicle door of claim 1, wherein:
   adhesive is arranged in a contact area of the first and the second door skins; or,
   an edge portion of the first door skin and an edge portion of the second door skin are connected via weld-bonding; or,
   a sealant is arranged in a contact area of the first and the second door skins, and an edge portion of the first door skin and an edge portion of the second door skin are fastened through riveting.

5. The vehicle door of claim 1, wherein a thickness of the first door skin is different from a thickness of the second door skin.

6. The vehicle door of claim 5, wherein the first door skin is an inner door skin, the second door skin is an outer door skin, and the outer door skin is thicker than the inner door skin.

7. The vehicle door of claim 6, wherein the first and the second door skins are made of stainless steel.

8. The vehicle door of claim 1, wherein the vehicle door is a kinked vehicle door, and a door skin portion forming a longitudinal side face of the vehicle door has a cut at a kink position.

9. The vehicle door of claim 1, further comprising a connector arranged at a side face of the vehicle door.

10. The vehicle door of claim 1, further comprising a stiffening plate arranged at a side face of the vehicle door.

11. The vehicle door of claim 1, wherein:
    the first and the second sealing lips are able to engage together through a projection and an indentation;
    one of the projection and the indentation is arranged on one side of the two opposite sides of the first and the second sealing lips; and
    the other one of the projection and the indentation is arranged on the other side of the two opposite sides of the first and the second sealing lips.

12. The vehicle door of claim 11, wherein a plurality of spaced projections are arranged on the first sealing lip along a longitudinal direction of the first sealing lip, or one projection extending along the longitudinal direction of the first sealing lip is arranged on the first sealing lip.

13. The vehicle door of claim 12, wherein a cross section of the projection has a barb shape.

14. The vehicle door of claim 1, wherein the first and the second sealing lips form a dovetail groove engaging with a sealing strip on the vehicle body at one side of a portion of the engagement far away from the main body.

15. The vehicle door of claim 1, wherein the strip-shaped seal is made of rubber.

16. The vehicle door of claim 1, wherein the connector is a screw, and the vehicle door further comprises a press plate located between a head of the screw and the main body.

17. A railway vehicle comprising a vehicle door that includes:
    a first door skin;
    a second door skin; and
    a foam material filled between the first and the second door skins,
    wherein the first and the second door skins and the foam material form a laminated structure, the first door skin has at least one folded edge portion, the second door skin has at least one first bent edge portion, and each of the at least one first bent edge portion is clamped in one of a corresponding at least one folded edge portion,
    a strip-shaped seal for sealing a gap between the vehicle door and a vehicle body or between vehicle doors,
    wherein the strip-shaped seal has a main body to be fastened to a side face of the vehicle door via a connector, and a first sealing lip and a second sealing lip both extending from one side of the main body;
    a side of the first sealing lip is opposite a side of the second sealing lip, wherein the two opposite sides of the first and the second sealing lips can engage together to be fastened; and the first and the second sealing lips after the engagement and the main body are able to form a space for accommodating the connector.

18. The railway vehicle of claim 17, wherein edges of the first door skin are all folded edge portions.

* * * * *